United States Patent Office 3,641,197
Patented Feb. 8, 1972

3,641,197
POLYMER COMPOSITIONS AND METHOD FOR THE PRODUCTION THEREOF
William Dean Holland, Woodbridge, Joseph Michael Schmitt, Ridgefield, and Richard McDonald Griffith, Wilton, Conn., assignors to American Cyanamid Company, Stamford, Conn.
No Drawing. Filed Apr. 17, 1969, Ser. No. 817,154
Int. Cl. C08g 37/32
U.S. Cl. 260—854                                                    10 Claims

ABSTRACT OF THE DISCLOSURE

A method for the production of compositions comprising a polymer of methyl methacrylate, a copolymer of ethylene, and a polyalkylated polymethylolmelamine and the products produced thereby, are disclosed.

BACKGROUND OF THE INVENTION

The invention described herein relates broadly to the field of high impact molding compositions. The invention resides in molding compositions which contain a resinous polymer and a rubbery polymer.

The production of thermoplastic molding compositions having excellent impact strength, chemical resistance, transparency etc. is well known in the art. For instance, molding compositions have been prepared from blends of styrene-acrylonitrile copolymers and cross-linked butadiene-styrene rubber, see U.S. 3,073,798. Additionally, molding compositions have been prepared by blending a hard resin of methyl methacrylate with grafted polybutadiene or butadiene/styrene rubbers, see U.S. 3,261.887. Other compositions have been prepared from polystyrene and a lightly cross-linked copolymer of ethylene and vinyl acetate, see U.S. 3,218,373.

Weatherable compositions comprising a polymer of methyl methacrylate and an ethylene copolymer are disclosed and claimed in copending application, Ser. No. 618,107, filed Feb. 23, 1967 by Schmitt et al., which application is hereby incorporated herein by reference.

The instant invention is directed to an improved process for producing compositions of the methyl methacrylate/ ethylene copolymer type disclosed above, said compositions having improved impact properties and melt fluidity. Furthermore, the instant process results in compositions which, when ultimately extruded, injection molded or otherwise formed into articles, results in products having improved surface gloss and smoothness.

SUMMARY

The novel compositions of the instant invention find uses as industrial and household molding-extrusion compositions. That is to say, they may be molded such as by vacuum molding, blow molding etc. into such articles as containers for food, drugs, chemicals, etc.; shower doors, automobile accessories, eyeglass frames and lenses, light reflectors and housings and like.

DESCRIPTION OF THE INVENTION INCLUDING PREFERRED EMBODIMENTS

Our novel polymer compositions comprise from about 25% to about 99% of (A) a polymer of (1) methyl methacrylate, (2) up to 50%, by weight, based on the total weight of (A), of vinyl acetate, an alkyl acrylate or mixtures thereof, and (3) up to 20%, by weight, based on the total weight, of (1), (2) and (3), of at least one other comonomer copolymerizable with said methyl methacrylate, from about 1% to about 75% of (B) a rubbery polymer of (a) ethylene, (b) a comonomer comprising vinyl acetate, alkyl acrylates and methacrylates, said alkyl group having from 1–18 carbon atoms, inclusive, acrylic acid, methacrylic acid or mixtures thereof, said rubbery polymer containing from about 50% to about 99.5% of said (a) and from about 0.5% to about 50% of said (b), and (c) up to about 20%, by weight, based on the total weight of said (a), (b) and (c), of another monomer copolymerizable with said ethylene, at least one of said (b) and/or said (c) containing a group reactive with (C), and (C) a polyalkyl ether of a polymethylolmelamine.

The ethylene copolymers used herein are generally well known in the art and their properties and methods for their preparation are more fully discussed in U.S. Pat. No. 3,218,373, mentioned above, and U.S. Pat. No. 3,215,678 which patents are hereby incorporated herein by reference. The rubbery copolymers we have found useful comprise from about 50% to about 99.5% of ethylene and from about 0.5% to about 50% of vinyl acetate, an alkyl acrylate or methacrylate, acrylic acid or methacrylic acid. Mixtures of two or more comonomers may also be used. Up to 20% of another monomer copolymerizable with ethylene, such as those monomers set forth hereinbelow in regard to those copolymerizable with methyl methacrylate, may also be added. The rubbery copolymer may have a melt index, as determined by ASTM–D1238– 57T (grams/10 min.) of from about 0.1 to about 400, preferably 1.0 to 350.

The only critical feature of the rubbery ethylene copolymer is that at least one of the monomers copolymerized with the ethylene must contain a group which is reactive with the polyalkyl ether of a polymethylolmelamine more fully set forth hereinbelow. Groups which are reactive with said melamines are well known in the art and include hydroxy groups, carboxy groups, amide groups, anhydride groups and the like. Some preferred monomers are: acrylic and methacrylic acid, acrylamide, hydroxyethyl methacrylate, hydroxypropyl methacrylate, maleic anhydride, methacrylamide and the like. Any of the other monomers set forth hereinbelow in regard to those monomers copolymerizable with methyl methacrylate which contain any of said groups may therefore be utilized. Obviously, if the copolymer is made up of ethylene and acrylic or methacrylic acid, no third monomer containing such a reactive group is necessary. If, however, the ethylene copolymer contains ethylene and an acrylate, a methacrylate or vinyl acetate, as the first two components thereof, the third component must contain such a reactive group.

The methyl methacrylate resinous polymer phase of our compositions may comprise from about 50% to about 100% of methyl methacrylate and, correspondingly, from about 0% to about 50% of vinyl acetate or an alkyl acrylate wherein the alkyl group has 1–18 carbon atoms, inclusive. Mixtures of vinyl acetate and an alkyl acrylate may also be used in the copolymer phase in the above concentrations. The methyl methacrylate copolymer, i.e. that containing vinyl acetate and/or alkyl acrylate, may also contain up to 20%, by weight, based on the total weight of the polymer, of a copolymerizable monomer such as the allyl, methallyl, crotyl, 1-chloroallyl, 2-chloroallyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, malonic, succinic, glutaric, adipic, pimelic, suberic, azelaic, maleic, fumaric, citraconic, mesaconic, itaconic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, divinyl benzene, trivinyl benzene, allyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, etc.; unsaturated ketones, e.g., methyl vinyl ketone, methyl allyl ketone, etc.

Other examples of monomers than can be interpolymerized with the methyl methacrylate, vinyl acetate and/or alkyl acrylate are the vinyl halides, more particularly vinyl chloride, vinyl bromide and vinyl iodide, and the various vinylidene compounds, including the vinylidene bromide, vinylidene fluoride and vinylidene iodide.

Among other comonomers which may be used in carrying our invention into effect by interpolymerizing them with the methyl methacrylate, vinyl acetate and/or alkyl acrylate are, for example, compounds such as acrylonitrile, and other compounds, e.g., the various substituted acrylonitriles (e.g., methacrylonitrile, ethacrylonitrile, phenylacrylonitrile, etc.) also other acrylates and methacrylates such as methyl acrylate, n-hexyl acrylate, t-butyl methacrylate, stearyl methacrylate and the like. It is preferred that the methyl methacrylate polymer phase be free of any of the above-mentioned melamine reactive groups in that the presence of such groups causes cross-linking of the polymer phase and renders the resultant product difficultly moldable.

The polyalkyl ethers of the polymethylolmelamines comprising the third component of our novel compositions are well known to those skilled in the art. The polyalkyl ethers encompass the dimethyl, diethyl, dipropyl, dibutyl, etc. ethers, the trimethyl, triethyl, tripropyl, tributyl, etc. ethers, the tetramethyl, tetraethyl, tetrapropyl, tetrabutyl, etc. ethers, the pentamethyl, pentaethyl, pentapropyl, pentabutyl, etc. ethers, and the hexamethyl, hexaethyl, hexapropyl, hexabutyl, etc. ethers of the dimethylol, trimethylol, tetramethylol, pentamethylol or hexamethylol melamines. Of course, mixed polyalkyl ethers such as the dimethyl, tetraethyl ethers, etc. of the polymethylol melamines may also be used. The preferred melamine is hexakismethoxymethylmelamine. These materials may be produced as set forth in U.S. Patent Nos. 2,906,724; 2,918,452; 2,998,410; 2,998,411; 3,107,227; 3,422,076, etc. which patents are hereby incorporated herein by reference. The polyalkyl ethers of the polymethylol melamines may be present in the final compositions in amounts ranging from about 0.1% to about 10.0%, preferably from about 0.5% to about 2.0%, by weight, based on the weight of the ultimate compositions.

Our novel compositions can be produced by a multiplicity of procedures. For example, grafted ethylene rubbery copolymers may first be wet or dry blended with the methyl methacrylate polymer and then the melamine compound added thereto under conditions effective to cause reaction of the melamine with the rubbery ethylene copolymer i.e. at temperatures ranging from about 100° C. to about 300° C. When this method is utilized the ethylene rubber must first be grafted with a vinyl monomer utilizing any known technique for producing such a product such as that set forth hereinbelow in regard to the interpolymerization technique of producing our novel compositions. An acid catalyst suhc as p-toluene sulfonic acid may be used during the melamine reaction, if desired. Alternatively, the melamine can first be reacted with the grafted ethylene rubber and the methyl methacrylate resin then blended with the resultant material. Since the ethylene copolymer must be grafted with at least one vinyl monomer, the melamine can also be reacted with the ethylene rubber during the grafting operation.

A further method for the production of our compositions comprises reacting the ungrafted ethylene rubber with the melamine and then interpolymerizing the methyl methacrylate, with or without other monomers, with the resultant material. This method causes both grafting of the ethylene rubber and formation of the methyl methacrylate polymer component. Similarly, the melamine can be added with the methyl methacrylate monomers during the interpolymerization.

As suggested above, the melamine can also be reacted with the interpolymerization product resulting from the reaction of the methyl methacrylate monomers and the ethylene copolymer. This latter method is, in fact, the most preferred of those indicated above in that such a technique obviates many difficulties which may arise during the previously described techniques, such as gelling etc.

When utilizing this latter method, the interpolymerization may be conducted in one stage or a series of stages, the general conditions remaining the same no matter how many stages are used.

That is to say, the interpolymerization may be conducted at temperatures of from about 10° C. to 50° C. and in the presence of a known free-radical generating catalyst which initiates the polymerization of monomeric methyl methacrylate. Suitable catalysts include, for example, the organic peroxides such as methyl ethyl ketone peroxide, benzoyl peroxide; the hydroperoxides such as cumene hydroperoxide; the persulfate type compounds such as potassium persulfate, or catalysts such as azobis-isobutyronitrile and the like. Additionally, such catalysts as lauroyl peroxide, 2,5 - dimethyl-2,5-di(t-butylperoxy)-hexane, the dialkyl peroxides, e.g., diethyl peroxide, dipropyl peroxide, dilauryl peroxide, dioleyl peroxide, distearyl peroxide, di-(tertiary-butyl) peroxide and di-(tertiary-amyl) peroxide, such peroxides often being designated as ethyl, propyl, lauryl, oleyl, stearyl, tertiary-butyl and tertiary-amyl peroxides; the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxides, propionyl peroxide, lauroyl peroxide, stearoyl peroxide, malonyl peroxide, succinyl peroxide, phthaloyl peroxide, benzoyl peroxide, etc.; fatty oil acid peroxides, e.g. coconut oil acid peroxides; etc., unsymmetrical or mixed diacyl peroxides, e.g., acetyl benzoyl peroxide, propionyl benzoyl peroxide, etc., terprene oxides, e.g. ascaridole, etc.; and salts of inorganic per-acids, e.g. ammonium persulfate, sodium persulfate, sodium percarbonate, potassium percarbonate, sodium perborate, potassium perborate, sodium perphosphate, potassium perphosphate, etc., may be used. Other organic peroxide catalysts which may be employed are the following: tetralin hydroperoxide, tertiary-butyl diperphthalate, tertiary-butyl perbenzoate, 2,4 - dichlorobenzoyl peroxide, urea peroxide, caprylyl peroxide, p-chlorobenzoyl peroxide, 2,2-bis-(tertiary butylperoxy) butane, hydroxyheptyl peroxide, the diperoxide of benzaldehyde and the like. Generally the catalyst may be employed in amounts ranging from about 0.01% to about 10%, by weight, based on the weight of the methyl methacrylate alone or with other monomers employed therewith.

If two or more stages are utilized for the interpolymerization, such a technique being most preferred of all those set forth hereinabove, all the catalysts may be added in the first stage of the polymerization process. However, it is preferred that from about 0.0% to about 5.0% of the catalyst based on the weight of the monomer be added during the second stage, the total in the two stages ranging from about 0.01% to about 15.0%, same basis.

In such a two-stage process, the first stage is conducted at a rate of polymerization of not less than about 3% conversion per hour and the second stage is conducted at a rate of not less than 1% conversion per hour, in order to assure the most beneficial properties of the resultant composition.

The initial stage of the process should also be conducted for a length of time so as to accomplish at least about 90% conversion of the monomers charged thereto, conversion of the remaining monomer, if any, being accomplished in the second stage along with the additional monomer added thereto.

As mentioned above, the concentration of ethylene copolymer in the final product of from about 1–75%, by weight, based on the total weight of the resultant composition with, correspondingly, from about 99% to about 25% of the methyl methacrylate polymer.

The amount of methyl methacrylate or mixture of methyl methacrylate with one or more comonomers charged to the first stage of the process should range from about 2% to about 98%, based on the amount of methyl methacrylate polymer in the final product. Similarly, the amount of methyl methacrylate monomer or mixture of methyl methacrylate monomer with one or more comonomers charged to the second stage should range from about 2% to 98%, same basis, the total charged monomers to stages one and two totaling 100%.

No chain transfer agent need be utilized in a one-stage process or in the first stage of a two-stage process, however, the use of from about 0.1% to about 1.0%, by weight, based on the weight of monomer or monomers added to the second stage in a two-stage process can be used to adjust the fluidity of the final product in said second stage.

It is not critical that a solvent be utilized in any interpolymerization procedure, however, for purposes of easier processing, a solvent such as toluene, xylene etc. may be used.

The resultant interpolymerization product may then be reacted with the melamine as mentioned above and then recovered, such as by devolatilization of the interpolymerization reaction media e.g. by heating at 110° C. to 260° C. under vacuum at an absolute pressure of 5 mm. to 200 mm. mercury, as is known in the art, see, for example U.S. Pat. No. 3,090,767. Alternatively, the interpolymerization product may be recovered by devolatilization and then reacted with the melamine compound.

As suggested above, it is extremely critical that the ethylene copolymer be cross-linked. The cross-linking is accomplished by the reaction of the melamine compound with the reactive group in the ethylene copolymer. We have found that this method of cross-linking, contrasted to other methods such as irradiation or peroxy catalyst reaction, does not degrade the methyl methacrylate polymer portion of the composition as evidenced by the change in the melt index of the final products.

Transparency of the molding compositions of the instant invention may be achieved by matching the refractive indices of the two polymer phases, i.e. the methyl methacrylate polymer phase and the rubbery ethylene copolymer phase. This is readily achieved since the refractive indices of the specific ethylene copolymers employed are easily determined. Transparency can be achieved by matching the known refractive index of the ethylene copolymer with that of the methyl methacrylate polymer within about .005 refractive index units.

As is the case of those compositions disclosed in the above-mentioned copending application, our novel compositions may also be rendered weatherable. This result can be achieved by the addition of any known ultraviolet light absorber thereto. That is to say, we have found that incorporation of a U.V. stabilizer such as 2-(2'-hydroxy-5'-methylphenyl)benzotriazole into our compositions increases the weatherability of the composition. By adding these additives, the excellent properties, i.e. impact strength, etc. of the compositions are maintained relatively constant while, with no additives, these properties are dissipated when exposed to ultraviolet light.

Examples of other ultraviolet light absorbers which may be used include the benzylidene esters such as p-methoxybenzylidene dimethyl malonate; the benzophenones such as 2-hydroxy-4-methoxybenzophenone, 2-hydroxy-4-octyl-oxybenzophenone, 2-hydroxy-4-methoxy-2'-methylbenzophenone; the 2,2'-dihydroxy-4,4'-dialkoxybenzophenones; 2 - hydroxy - 5 - salicylylbenzophenone; 2-(2-hydroxy-5-t - octylphenyl)benzotriazole; nickel phenolates (U.S. 2,971,940); carbostyrils (U.S. 2,616,855); β-methyl umbellifirone; 4-methyl-7-diethylamino courmarin; the dibenzoyl alkyl phenols such as 2,6-dibenzoyl-4-methylphenol (U.S. 2,890,193) and the like. The ultraviolet light stabilizer should be used in amounts ranging from about 0.05% to about 5.0%, preferably from about 0.5% to about 3.0%, by weight, based on the total weight of the composition.

We have also found that the incorporation of any well-known stabilizer into our novel compositions results in systems which may be easily fabricated under heat and pressure without any material degradation of the properties thereof. In this regard, such stabilizers as the phenols e.g. 2,6-di-t-butyl-4-methylphenol, tris-t-octylphenol, tris-α-methylbenzylphenol; α-methylcyclohexylated cresols and xylenols; butylated p-phenylphenol; butylated bisphenol A; 2,6-di-t-butyl-4-dimethyl aminomethyl phenol; 4,4'-dihydroxy-diphenyl; 2,2'-methylene-bis(4-ethyl-6-t-butylphenol); 4,4'-butylidene-bis(4-ethyl-6-t - butylphenol); thio - bis-(2-t-butyl-4-methylphenol); hydroquinone monobenzyl ether; 2-t-butyl hydroquinone monomethylether; tris-(nonylphenyl) phosphite, dilaurylthiodipropionate, distearylthiodipropionate, phenyldidecyl phosphite, methylene-bis(dinonyl phenol) and the like may be used.

These stabilizers can be utilized in the same amounts as the ultraviolet light stabilizers mentioned above.

Furthermore, various well-known additives may be added to the final composition. Such materials as fillers, photochromics, dyes, pigments and the like may be used for this purpose.

The following examples are set forth by way of illustration only and should not be construed as limiting the instant invention except as set forth in the appended claims. All parts and percentages are by weight unless otherwise specified.

EXAMPLE 1

One part of an ethylene/vinyl acetate/acrylic acid (74/25/1) terpolymer is dissolved in 4 parts of toluene in a suitable reaction vessel and to the resultant solution are added .015 part of t-butyl peracetate and 7.34 parts of a monomer mixture comprising 91% of methyl methacrylate and 9% of ethyl acrylate. The interpolymerization is run at about 100° C. for about 6 hours. The conversion of the 1st stage monomers being essentially complete, 8 parts of the above monomer mixture in a second stage charge containing .016 part of dodecyl mercaptan and .024 part of di-t-butyl peroxide to give approximately 10% of ethylene copolymer in the final product are added. The polymerization is continued at 100° C. for about 24 hours, i.e. to substantially complete conversion.

The resultant interpolymer is recovered by passing it through a devolatilizing extruder at a temperature of 375° F. and a residence time of about 5 minutes. The product emerges at about 500° F. 1.0% of hexakismethoxymethylamine (dissolved in toluene—50%) is then added to the molten interpolymer and the mixture is blended by milling for 5 minutes. To the milled blend is added 10 p.p.m. of p-toluene sulfonic acid and the blend is milled for an additional 5 minutes. The ultimate blend is then passed through an extruder at 250° C. (residence time—2 minutes) to cross-link the product.

EXAMPLE 2

The procedure of Example 1 is followed except that the melamine compound, sulfonic acid and a U.V. and thermal stabilizer dissolved in toluene are added to the interpolymer containing 36% toluene at 100° C. in an extructor and blended. The resultant mixture is then passed into a complex machine where the cross-linking takes place and volatiles are removed. The residence time is about 5 minutes and the temperature ranges from about 70° C. at the feed zone to about 220° C. at the die head.

The results of Examples 1 and 2 are set forth hereinbelow in Table I. Additionally, the procedure of Examples 1 and 2 were again followed except that various amounts of melamine compound were employed and different melamine compounds were added. Results of these runs are also set out in Table I.

product of Example 1 and could be easily fabricated into useful articles of manufacture.

EXAMPLE 27

A terpolymer of ethylene/stearyl methacrylate/methacrylic acid (72/26/2) is utilized in conjunction with methyl methacrylate, vinyl acetate and ethyl acrylate (90/5/5).

EXAMPLE 28

A terpolymer of ethylene, methyl acrylate and acrylamide (50/48/2) is utilized with methyl methacrylate,

TABLE I

| Example | Equipment | Melamine compound | Percent[1] | p-TSA,[1] p.p.m. | E/VA/AA | Percent[1] | Melt index[2] | Notched Izod impact strength, f.p.p.i. |
|---|---|---|---|---|---|---|---|---|
| 1 | Mill, extruder | HKMMM | 1.0 | 10 | 74/25/1 | 12 | 1.9 | 1.5 |
| 2 | Compex machine | HKMMM | 1.0 | 10 | 74/25/1 | 12 | 1.6 | 1.5 |
| 3 | Mill, extruder | HKMMM | 0 | 10 | 74/25/1 | 12 | 6.0 | 0.3 |
| 4 | do | HKMMM | 0.1 | 10 | 74/25/1 | 12 | 4.7 | 0.8 |
| 5 | do | HKMMM | 0.5 | 10 | 74/25/1 | 12 | 3.8 | 1.1 |
| 6 | do | HKMMM | 1.5 | 10 | 74/25/1 | 12 | 2.3 | 1.3 |
| 7 | do | HKMMM | 2.0 | 10 | 74/25/1 | 12 | 2.1 | 1.6 |
| 8 | do | HKMMM | 3.0 | 10 | 74/25/1 | 12 | 3.0 | 1.2 |
| 9 | do | HKMMM | 5.0 | 10 | 74/25/1 | 12 | 1.9 | 1.5 |
| 10 | do | HKMMM | 2.0 | 0 | 74/25/1 | 12 | | 1.2 |
| 11 | Mill | HKMMM | 1.5 | 10 | 74/25/1 | 12 | 1.8 | 1.3 |
| 12 | Mill, extruder | Mixed melamine[3] | 1 | 0 | 74/25/1 | 12 | | 1.2 |
| 13 | do | do[3] | 2 | 0 | 74/25/1 | 12 | | 1.2 |
| 14 | do | do[3] | 5 | 0 | 74/25/1 | 12 | | 0.9 |
| 15 | Compex machine | HKMMM | 0.0 | 0 | 74/25/1 | 12 | 2.5 | 0.4 |
| 16 | do | HKMMM | 2.0 | 10 | 74/25/1 | 12 | 1.4 | 1.8 |

[1] Based on total blend.
[2] Grams per 10 min. at 230°, load 3,800 g.
[3] Mixed melamine=$MF_{5.0}Me_{3.7}$ (average methylolation and methylation).

NOTE.—p-TSA=p-toluene sulfonic acid; HKMMM=hexakismethoxymethyl melamine; E=ethylene; VA=vinyl acetate; AA=acrylic acid.

EXAMPLE 17

An ethylene/vinyl acetate/acrylic acid (74/25/1) terpolymer rubber is grafted with methyl methacrylate and ethyl acrylate (91/9) at a rubber to monomer mixture ratio of 2:1 by dissolving the rubber in toluene and adding 0.020 part of 2,5-dimethyl-2,5-di-(t-butylperoxy)n-hexane in the monomer mixture in a suitable reaction vessel. The grafting is run at about 110° C. for 5½ hours.

To 15 parts of the resultant grafted rubber are added 85 parts of a copolymer of methyl methacrylate and ethyl acrylate (91/9). The mixture is then milled for 5 minutes with 0.1% of hexakismethoxymethyl melamine and for another 5 minutes with 10 p.p.m. of p-toluene sulfonic acid. The final blend is then passed through an extruder at 250° C. (residence time—2 minutes) to cause the cross-linking of the product.

The results of this run and additional runs varying the amount of melamine compound and the concentrations of the rubber and the methacrylate polymer are set forth below in Table II.

ethyl acrylate and vinyl acetate monomers (50/40/10). Dicumyl peroxide is used as the catalyst.

EXAMPLE 29

A copolymer of ethylene and acrylic acid (90/10) is used with methyl methacrylate, ethyl acrylate and stearyl methacrylate (90/8/2) monomers. 2% of the tetramethyl ether of hexamethyl melamine is used.

EXAMPLE 30

Methyl methacrylate, vinyl acetate and acrylonitrile (85/10/5) are interpolymerized in the presence of a copolymer of ethylene and methacrylic acid (85/15).

EXAMPLE 31

The terpolymer of ethylene, lauryl methacrylate and acrylic acid is used in place of the ethylene copolymer of Example 1.

EXAMPLE 32

Example 8 is followed except that a partially hydro-

TABLE II.—GRAFTED RUBBER-PREFORMED RESIN BLENDS

| Example | Equipment | Melamine compound | Percent | p-TSA,[1] p.p.m. | Grafted (R/M 2/1) E/VA/AA | Percent | Preformed resin, MMA/EA 91/9, percent | Melt index[1] | Notched Izod impact strength, f.p.p.i. |
|---|---|---|---|---|---|---|---|---|---|
| 18 | Mill, extruder | HKMMM | 0.1 | 10 | 74/25/1 | 15 | 85 | | 0.7 |
| 19 | do | HKMMM | 0.3 | 10 | 74/25/1 | 15 | 85 | | 0.8 |
| 20 | do | HKMMM | 0.5 | 10 | 74/25/1 | 15 | 85 | | 0.8 |
| 21 | do | HKMMM | 1.0 | 10 | 74/25/1 | 15 | 85 | 7.6 | 0.9 |
| 22 | do | HKMMM | 1.5 | 10 | 74/25/1 | 15 | 85 | 7.4 | 0.8 |
| 23 | do | HKMMM | 3.0 | 10 | 74/25/1 | 15 | 85 | 7.3 | 0.7 |
| 24 | do | HKMMM | 0.5 | 10 | 74/25/1 | 22 | 78 | | 1.0 |
| 25 | do | HKMMM | 1.0 | 10 | 74/25/1 | 22 | 78 | | 1.0 |
| 26 | do | HKMMM | 3.0 | 10 | 74/25/1 | 22 | 78 | | 1.0 |

[1] Based on total blend.

NOTE.—HKMMM=hexakismethoxymethyl melamine; p-TSA=p-Toluene sulfonic acid; E=ethylene; VA=vinyl acetate; AA=acrylic acid; MMA=methyl methacrylate; EA=ethyl acrylate.

The procedure of Example 1 is again followed except where indicated in Examples 26–44 except that various comonomers are utilized in conjunction with the ethylene and methyl methacrylate and different melamine compounds are reacted to crosslink the ethylene rubber. In each instance, the final compositions exhibited similar melt index stability and high impact strength to the lyzed (3%) ethylene/vinyl acetate (75/25) copolymer is utilized.

EXAMPLE 33

A copolymer of ethylene, stearyl acrylate and β-hydroxyethyl methacrylate (74/25/1) is substituted for the ethylene copolymer of Example 16.

EXAMPLE 34

A terpolymer of ethylene/vinyl acetate/maleic anhydride (75/24/1) is used in place of the ethylene polymer of Example 30.

EXAMPLE 35

Example 1 is followed except that the ethylene copolymer used therein is replaced by an ethylene/methyl acrylate/methacrylic acid (85/14/1) terpolymer. The dibutyl ether of trimethylol melamine is used.

EXAMPLE 36

Example 2 is again followed except that the rubbery ethylene polymer comprises ethylene-acrylic methacrylate (70/10/20). The pentaethyl ether or hexamethylol melamine is used at 3%.

EXAMPLE 37

Example 1 is again followed except that an ethylene/ methacrylic acid/acrylonitrile (80/2/18) rubbery polymer is interpolymerized with methyl methacrylate and methyl acrylate (90/10).

EXAMPLE 38

Example 11 is again followed except that the rubbery ethylene polymer comprises ethylene/acrylic acid/vinyl chloride (95/1/4). A butylated hexamethylol melamine is used.

EXAMPLE 39

The procedure of Example 12 is followed except that the ethylene rubbery polymer comprises ethylene/ethyl acrylate/methacrylamide (80/18/2).

EXAMPLE 40

Example 2 is followed utilizing an ethylene/ethyl acrylate/α-hydroxypropyl methacrylate rubbery polymer (80/17/3) instead of that used therein.

EXAMPLE 41

Example 2 is again followed. An ethylene/acrylic acid/vinylidene chloride (80/5/15) rubbery polymer used in place of that disclosed therein. A comparable product is recovered. A mixed methyl and ethyl ether of hexamethylol melamine is used at 2.7%.

EXAMPLE 42

Example 14 is followed with a 90/5/5 terpolymer of ethylene/methacrylic acid/methyl crotonate being used in lieu of the ethylene polymer disclosed therein.

EXAMPLE 43

The procedure of Example 1 is followed except that the methyl methacrylate polymer comprises a methyl methacrylate/stearyl acrylate (50/50) copolymer.

EXAMPLE 44

The procedure of Example 43 is carried out except that a methyl methacrylate/t-butyl acrylate/styrene (75/ 22/3) terpolymer is used. A triethyl ether of pentamethylol melamine is employed as the grafting reactant.

What is claimed is:

1. A composition of matter comprising (A) from about 25% to about 99% of a polymer of (1) methyl methacrylate, (2) up to 50%, by weight, based on the total weight of (A), of vinyl acetate, an alkyl acrylate wherein the alkyl group has 1–18 carbon atoms, inclusive or mixtures thereof, and (3) up to 20%, by weight, based on the total weight of (A), of another monomer copolymerizable with said methyl methacrylate, (B) from about 1% to about 75% of a methyl methacrylate grafted rubbery polymer of (a) ethylene, (b) a comonomer comprising vinyl acetate, alkyl acrylates or methacrylates, said alkyl group having from 1–18 carbon atoms, inclusive, acrylic acid, methacrylic acid or mixtures thereof, said rubbery polymer containing from about 50% to about 95% of said (a) and from about 5% to about 50% of said (b) and (c) up to about 20%, by weight, based on the weight of (a), (b) and (c) of another monomer copolymerizable with said (a), at least one of said (b) and said (c) containing a group reactive with (C), and (C) from about 0.1% to about 10.0%, based on the total weight of said (A), (B) and (C), of a polyalkyl ether of a polymethylolmelamine.

2. A composition according to claim 1 wherein said (A) and said (B) are present in the form of an interpolymer thereof.

3. A composition according to claim 1 wherein said (A) is a copolymer of methyl methacrylate and ethyl acrylate.

4. A composition according to claim 1 wherein said (B) is a terpolymer of ethylene, vinyl acetate and acrylic acid.

5. A composition according to claim 1 wherein said (C) is hexakismethoxymethylmelamine.

6. A method for the production of the composition of claim 1 which comprises (I) interpolymerizing said (A) and said (B) in a first stage at a temperature ranging from about 10° C. to about 150° C., in the presence of from about 0.01% to about 10.0%, by weight, based on the weight of said (A), of a free-radical generating catalyst, at not less than about 3% conversion per hour, until at least about 90% of said (A) is polymerized, said (A) being present in amounts ranging from about 2% to about 98%, based on the amount of said (A) in the final product, (II) continuing said interpolymerization at within said temperature range in the presence of up to about 5%, by weight, same basis, of additional free-radical generating catalyst, at not less than about 1% conversion per hour, with additional (A) so as to produce from about 1% 1% to about 75%, by weight, based on the total weight of the final composition, of said (B) in the final product and in the presence of up to about 1.0%, by weight, based on the amount of (A) added during said (II), of a chain transfer agent and (III) reacting the resultant interpolymerization product with a polyalkyl ether of a polymethylolmelamine.

7. A process according to claim 6 wherein said (A) is a copolymer of methyl methacrylate and ethyl acrylate.

8. A process according to claim 6 wherein said (B) is a terpolymer of ethylene, vinyl acetate and acrylic acid.

9. A process according to claim 6 wherein said (C) is hexakismethoxymethylmelamine.

10. A process for producing the composition of claim 1 which comprises physically blending said (A) and a grafted rubbery polymer of said (B) and reacting the resultant blend with a polyalkyl ether of a polymethylolmelamine.

References Cited

UNITED STATES PATENTS

| | | | |
|---|---|---|---|
| 2,557,266 | 6/1951 | Dittmar | 260—854 |
| 3,201,374 | 8/1965 | Simms | 260—854 |
| 3,287,444 | 11/1966 | Ennor et al. | 260—879 |
| 3,317,631 | 5/1967 | Rees | 260—854 |

FOREIGN PATENTS

| | | | |
|---|---|---|---|
| 697,734 | 11/1964 | Canada | 260—878 |
| 578,643 | 7/1946 | Great Britain | 260—854 |

JOHN C. BLEUTGE, Primary Examiner

U.S. Cl. X.R.

260—45.7 P, 45.8 SN, 45.85, 45.9, 45.95, 853, 855, 856 876 R, 878, 897 B